(12) United States Patent
Fu

(10) Patent No.: US 12,094,240 B2
(45) Date of Patent: Sep. 17, 2024

(54) OBJECT TRACKING METHOD AND OBJECT TRACKING DEVICE

(71) Applicant: VIA Technologies, Inc., Taipei (TW)

(72) Inventor: Liangfeng Fu, Shenzhen (CN)

(73) Assignee: VIA Technologies, Inc., Taipei (TW)

(*) Notice: Subject to any disclaimer, the term of this patent is extended or adjusted under 35 U.S.C. 154(b) by 372 days.

(21) Appl. No.: 17/720,575

(22) Filed: Apr. 14, 2022

(65) Prior Publication Data

US 2023/0237835 A1    Jul. 27, 2023

(30) Foreign Application Priority Data

Jan. 25, 2022 (CN) .......................... 202210089518.1

(51) Int. Cl.
G06V 40/16 (2022.01)
G06V 10/26 (2022.01)

(52) U.S. Cl.
CPC ............ G06V 40/165 (2022.01); G06V 10/26 (2022.01); G06V 40/168 (2022.01)

(58) Field of Classification Search
CPC .... G06V 40/165; G06V 10/26; G06V 40/168; G06V 10/774; G06V 40/103; G06V 40/161; G06V 40/171; G06V 10/62; G06T 7/246; G06T 2207/10016; G06T 2207/30201; G06T 2207/30241
See application file for complete search history.

(56) References Cited

U.S. PATENT DOCUMENTS

| | | | |
|---|---|---|---|
| 10,776,627 B2* | 9/2020 | Nishikawa | G06V 20/30 |
| 2020/0126239 A1* | 4/2020 | Qian | G01S 3/7864 |
| 2022/0215650 A1* | 7/2022 | Oami | G06T 7/246 |

FOREIGN PATENT DOCUMENTS

| | | |
|---|---|---|
| CN | 106991688 A | 7/2017 |
| CN | 113793363 A | 12/2021 |

* cited by examiner

*Primary Examiner* — Phuoc Tran
(74) *Attorney, Agent, or Firm* — McClure, Qualey & Rodack, LLP

(57) ABSTRACT

The present disclosure provides an object tracking method and an object tracking device. The method includes: acquiring a human-face region of an image frame so as to determine a human-body region; extracting a human-body feature from the human-body region, and determining whether a plurality of historical object trajectories match the human-body feature; in response to that one of the plurality of historical object trajectories matches the human-body feature, updating an age of the human-body feature to a preset value; and in response to that none of the plurality of historical object trajectories matches the human-body feature, adding an object trajectory corresponding to the human-body feature to the plurality of historical object trajectories. Thus, a better tracking effect may be achieved.

21 Claims, 4 Drawing Sheets

OBJECT TRACKING METHOD AND OBJECT TRACKING DEVICE

CROSS-REFERENCE TO RELATED APPLICATION

This application claims the priority benefit of China application serial no. 202210089518.1, filed on Jan. 25, 2022. The entirety of the above-mentioned patent application is hereby incorporated by reference herein and made a part of this specification.

TECHNICAL FIELD

The present disclosure relates to an image processing technology, and in particular to an object tracking method and an object tracking device.

BACKGROUND

A main task of multiple object tracking (MOT) is to detect moving objects in an image sequence after acquiring the image sequence, and then, by MOT, each object will be assigned with an identification (ID), and the identification of the same object is ensured not to change in different frames.

In the prior art, although there are MOT algorithms such as optical flow and Kernel Correlation Filter (KCF) with fast tracking speed, tracking effects of these technologies are mostly poor.

In addition, with the development of a deep learning technology, there are several deep learning algorithms proposed for MOT, but most of these methods have slow tracking speed, and accordingly cannot be applied in the industry.

SUMMARY

In view of this, the present disclosure provides an object tracking method and an object tracking device, which can be used to solve the above technical problems.

The present disclosure provides an object tracking method, including: acquiring a first human-face region of an image frame so as to determine a first human-body region; extracting a first human-body feature from the first human-body region, and determining whether a plurality of historical object trajectories match the first human-body feature; in response to that one of the plurality of historical object trajectories matches the first human-body feature, updating a first age of the first human-body feature to a preset value; and in response to that none of the plurality of historical object trajectories matches the first human-body feature, adding an object trajectory, corresponding to the first human-body feature, to the plurality of historical object trajectories.

The present disclosure provides an object tracking device, including a storage circuit and a processor. The storage circuit stores program codes. The processor is coupled to the storage circuit, and accesses the program codes to: acquire a first human-face region of an image frame so as to determine a first human-body region; extract a first human-body feature from the first human-body region, and determine whether a plurality of historical object trajectories match the first human-body feature; in response to that one of the plurality of historical object trajectories matches the first human-body feature, update a first age of the first human-body feature to a preset value; and in response to that none of the plurality of historical object trajectories matches the first human-body feature, add an object trajectory, corresponding to the first human-body feature, to the plurality of historical object trajectories.

The present disclosure provides an object tracking device, including a storage circuit and a processor. The storage circuit stores program codes. The processor is coupled to the storage circuit, and accesses the program codes to: by a first execution thread, find out a first human-face region in an image frame and determine a first human-body region on the basis of the first human-face region; by a second execution thread, extract a first human-body feature from the first human-body region, and by a third execution thread: determine whether a plurality of historical object trajectories match the first human-body feature; in response to that one of the plurality of historical object trajectories matches the first human-body feature, update a first age of the first human-body feature to a preset value; and in response to that none of the plurality of historical object trajectories matches the first human-body feature, add an object trajectory, corresponding to the first human-body feature, to the plurality of historical object trajectories.

Figure 1:
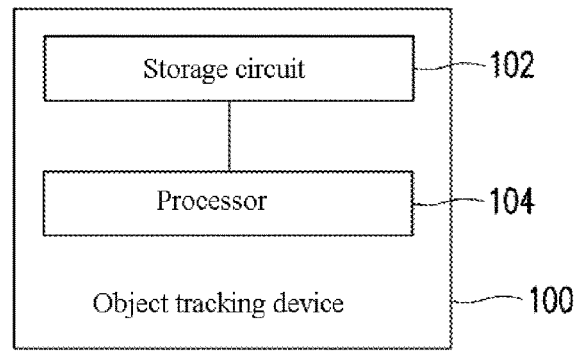
FIG. 1 is a schematic diagram of an object tracking device according to an embodiment of the present disclosure.

A brief description of the reference numerals is as follows:
100: object tracking device; 102: storage circuit; 104: processor; 300 and 500: image frame; 310: human-face region; 320: converted human-face region; 330 and 520: first human-body region; 410: cropping template; 411: outer contour; 413: inner contour; 420: training image; 430: cropping region; 1-7: converted human-face region; 531: overlap region; 531$a$: first region: 532: non-overlap region; 532$a$: second region: DD: specific distance; D1: first designated distance: D2: second designated distance; $w_0$: width; and S210-S250: steps.

DETAILED DESCRIPTION

An embodiment of this application is to implement multiple object tracking on the basis of a deep sort technology. Deep sort is a multiple object tracking method based on deep learning, which is widely used in the industry due to its advantages of fast speed, high customizability of model, good effect, and simple implementation. Application fields of deep sort include human-face tracking, pedestrian tracking, video analysis, video surveillance, automated driving, and the like. Generally, the deep sort described in this embodiment may include: (1) object detection; (2) feature extraction; (3) state estimation; (4) trajectory processing; (5) matching, and other steps.

In the step of object detection, a trained deep learning object detection model is used to detect positions of all objects (such as a human face or body) in a current image frame. In the step of feature extraction, a region of interest (ROI) where an object is located is cropped based on the detected position of the object. Then, a trained deep learning feature extraction model is used to extract a deep feature from each ROI. The deep feature is also referred to as a deep appearance feature.

In the step of state estimation, a Kalman filter may be used to estimate state information (e.g., speed and position) of a tracked object at the current moment.

In the step of trajectory processing, a trajectory may be recorded for each tracked object, and each trajectory matches a corresponding tracker. Each track is used to record information such as track identification (track ID), age, historical deep feature, and position of an object corresponding thereto.

For a new object that does not match an existing trajectory (historical object trajectory), it is necessary to add a new trajectory generated by the new object to the existing trajectories, and configure a corresponding tracker and a corresponding track ID for the new trajectory. In addition, age of the new trajectory needs to be initialized to a preset value (e.g., 1), and information such as a deep feature and position of the new object also needs to be stored.

If a certain object in an image frame (hereinafter referred to as image frame A) is determined to correspond to a certain historical object trajectory, the age of the historical object trajectory can be updated to a preset value (e.g., 1). On the other hand, if it is determined that any object in the image frame A does not correspond to a certain historical trajectory, the age of the historical object trajectory is updated (add 1); if the age of a certain historical object trajectory is greater than an upper limit value (e.g., 100), the historical object trajectory will be removed from a set of the existing trajectories (historical object trajectories).

The step of matching mainly includes state matching, deep feature matching, synthetic matching, and the like. In the state matching, a Kalman filter may be used to generate a present estimated position for each historical object trajectory on the basis of a plurality of historical positions in the historical object trajectory, and a Mahalanobis Distance between a present position of a certain object B in the image frame A and the estimated position for the historical object trajectory is estimated. Then, an initial matching result can be obtained by Hungary matching, and qualified matching is screened based on a set distance threshold (for example, which historical object trajectory might match the abovementioned object B).

In the step of deep feature matching, a cosine distance between a deep feature of the object B and a deep feature of each historical object trajectory may be estimated. Then, an initial matching result can be obtained by Hungary matching, and finally qualified matching is screened based on a set distance threshold (for example, which historical object trajectory might match the abovementioned object B).

In the step of synthetic matching, a result of state matching and a result of deep feature matching may be synthesized as a synthetic matching result. For example, the result of state matching and the result of deep feature matching may be subjected to a weighting operation to generate a synthetic matching result.

For details about deep sort, reference may be made to document "Wojke, N., Bewley, A., Paulus, D.: Simple online and realtime tracking with a deep association metric. In: 2017 IEEE international conference on image processing (ICIP). pp. 3645-3649. IEEE (2017)", which will not be repeated here.

Generally, a method of implementing deep feature matching by a deep sort technology includes using a human-face feature as a deep feature to perform deep feature matching (hereinafter referred to as mode 1) and using a human-body feature as a deep feature to perform deep feature matching (hereinafter referred to as mode 2).

In mode 1, a pre-trained human-face detection model is used to detect a human-face position in an image frame, and a human-face feature extraction model is used to extract the human-face feature at this human-face position as a deep feature. In mode 2, a model capable of detecting both the human face and body is used to detect positions of the human face and body in an image frame, and a pre-trained human-body feature extraction model is used to extract a corresponding human-body feature as a deep feature. After the deep features in the mode 1 and mode 2 are obtained respectively, related steps such as state estimation, trajectory processing and matching may be executed. The details can be referred to the previous description, which will not be repeated here.

However, in the mode 1, the human face occupies a small range in the image frame, and accordingly feature information contained therein is less apparent. In addition, the human-face feature is easily affected by the changes in angle and motion of the human face, and accordingly is relatively unstable. In this case, if the human-face feature is used as a deep feature to perform the foregoing matching operation, a low matching success rate will occur, which will easily lead to a lost of a tracked object.

In addition, in the mode 2, a data set marked with human-face and body position information needs to be created additionally, which will take a lot of time and labor. That is, it is quite difficult to train a model that can detect both the human face and body. Further, due to great difference of faces and postures/sizes of different human bodies, if detection on both the human face and body is needed, a network/model that is more advanced and complicated than that for human-face detection also needs to be designed such that a better detection effect can be obtained. However, such a network/model may cause a high computation, thereby leading to slow operation and low frame rate on equipment with the same configuration. When the frame rate decreases, the matching result will be affected accordingly, which may further affect the tracking effect.

In view of this, the present disclosure provides a novel object tracking method applied to another embodiment. The novel object tracking method has the advantages such as good tracking effect, higher speed, and implementation easiness. The following is the further description.

FIG. 1 is a schematic diagram of an object tracking device according to an embodiment of the present disclosure. In different embodiments, an object tracking device 100 may be implemented as various smart devices and/or computer devices, but may not be limited thereto.

As shown in FIG. 1, the object tracking device 100 may include a storage circuit 102 and a processor 104. The storage circuit 102 is, for example, any type of fixed or removable Random Access Memory (RAM), Read-Only Memory (ROM), Flash memory, hard disk, or other similar device or a combination of these devices, and can be used to record a plurality of program codes or modules.

The processor 104 is coupled to the storage circuit 102 and may be a general-purpose processor, a special-purpose processor, a conventional processor, a digital signal processor, a plurality of microprocessors, one or more microprocessors integrated with the core of digital signal processor, a controller, a microcontroller, an Application Specific Integrated Circuit (ASIC), a Field Programmable Gate Array (FPGA), any other type of integrated circuit, a state machine, an Advanced RISC Machine (ARM)-based processor, and the like.

In the embodiment of the present disclosure, the processor 104 may access a module and program codes that are recorded in the storage circuit 102 to implement the object tracking method proposed in the present disclosure. Its details are described below.

Figure 2:
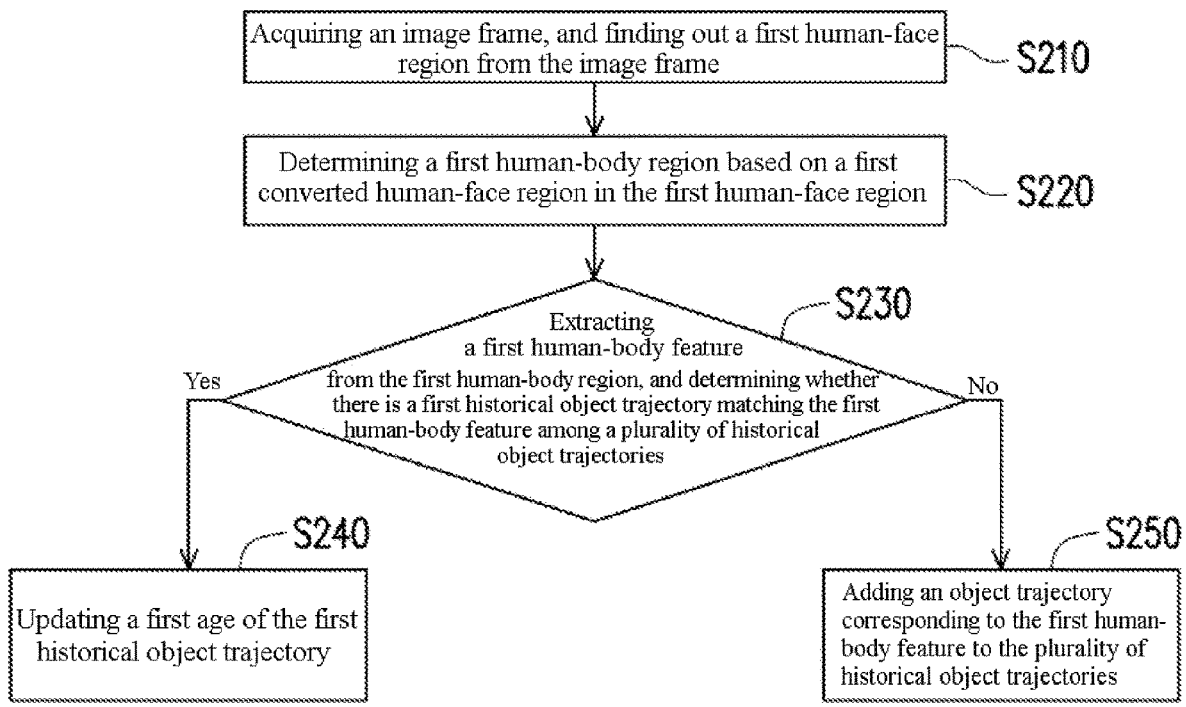
FIG. 2 is a flow chart of an object tracking method according to an embodiment of the present disclosure.

FIG. 2 is a flow chart of an object tracking method according to an embodiment of the present disclosure. The method according to the embodiment may be executed by the object tracking device 100 in FIG. 1. The details of each step in FIG. 2 will be described below in conjunction with components shown in FIG. 1. In addition, the processor 104 of the present disclosure may execute one or more steps in FIG. 2 by different execution threads respectively, so as to improve processing efficiency and achieve full decoupling between various steps and making the various steps independent from one another.

Firstly, in S210, the processor 104 (by a first execution thread) acquires an image frame, and finds out a first human-face region from the image frame. In an embodiment, the processor 104 may input the image frame into a human-face detection model. The human-face detection model may find out one or more human-face regions from the image frame based on the human-face detection model. In the embodiment of the present disclosure, the human-face detection model described above may be any of existing models that can find out an image region corresponding to the human face from the image frame, but may not be limited thereto.

Figure 3:
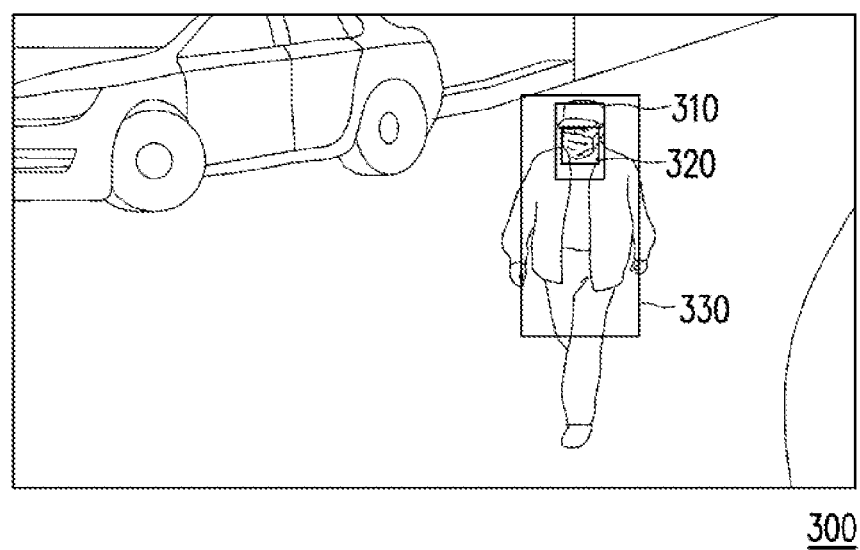
FIG. 3 is an application scenario diagram according to an embodiment of the present disclosure.

Then, in S220, the processor 104 (by the first execution thread) obtains a first converted human-face region by conversion on the basis of the first human-face region so as to determine a first human-body region. To make the concept of the present disclosure easier to understand, the following description will be supplemented with the content of FIG. 3. FIG. 3 is an application scenario diagram according to an embodiment of the present disclosure. In FIG. 3, assuming that there is only one human-face region 310 in an image frame 300, the processor 104 may regard the human-face region 310 as the abovementioned first human-face region (hereinafter referred to as a first human-face region 310), but may not be limited thereto.

Then, the processor 104 may obtain a converted human-face region 320 by conversion based on the first human-face region 310, so that a first human-body region 330 is further generated. In an embodiment, the processor 104 may define a region, based on the first human-face region 310, in the image frame 300, as the first human-body region 330, but may not be limited thereto.

In an embodiment, a width and a height of the first human-face region 310 may be $w_1$ and $h_1$ (an aspect ratio is $w_1:h_1$), coordinates of a center point of the first human-face region 310 in the image frame 300 may be represented as (cx, cy), coordinates of an upper left corner of the first face region 310 in the image frame 300 may be represented as (l, t), and coordinates of a lower right corner of the first face region 310 in the image frame 300 may be represented as (r, b). In this case, the width $w_1=r-l$, the height $h_1=b-t$, $cx=l+w_1/2$ in the coordinates of the center point, and $cy=t+h_1/2$ in the coordinates of the center point can be calculated for the first human-face region 310. In an embodiment, the first square converted human-face region 320 with a side length s of $(w_1+h_1)/2$ and the center point of (cx, cy) is obtained by conversion on the basis of data $w_1$ and $h_1$ and the center point (cx, cy) of the first human-face region 310. In another embodiment, based on (the data of) the first human-face region 310, the processor 104 may obtain the first converted human-face region 320 with a different side length or center point, or in another shape by conversion, but the present disclosure may not be limited thereto.

After the first converted human-face region 320 is obtained by conversion, the processor 104 may determine the first human-body region 330 on the basis of the converted human-face region 320, a preset image aspect ratio $w_2:h_2$, and a plurality of expansion parameters. As shown in FIG. 3, the first human-body region 330 may include the first converted human-face region 320. That is, the first converted human-face region 320 may be located in the first human-body region 330.

In an embodiment, the abovementioned expansion parameters may include m and n (which are respectively an integer) that are used for, when an aspect ratio of the first human-body region 330 is inconsistent to the preset image aspect ratio $w_2:h_2$, expanding m pixel points upwards, respectively expanding n pixel points leftwards and rightwards, and expanding $[(2n+s)\times h_2/w_2-m-s]$ pixel points downwards on the first human-body region 330, so that the aspect ratio of the first human-body region 330 is equal to the preset image aspect ratio $w_2:h_2$, thereby avoiding distortion.

Specifically, when the coordinates of the upper left corner of the first human-body region 330 in the image frame 300 are (bl, bt), and the coordinates of the lower right corner of the first human body region 330 in the image frame 300 are (br, bb), then coordinates of the first human-body region 330 may be represented as:

$$(bl,bt,br,bb)=(cx-s/2-n, cy-s/2-m, cx+s/2+n, cy-s/2-m+(2n+s)\times h_2/w_2)$$

where the coordinates of the first human-body region 300 indicate the position and a range of the region of the first human-body region 330.

In an embodiment, when the preset image aspect ratio is 1:2, that is, $w_2:h_2=1:2$, the coordinates of the first human-body region 330 may be represented as:

$$(bl,bt,br,bb)=(cx-3\times s/2, cy-3\times s/2, cy-3\times s/2, cy+3\times s/2+3\times s)$$

After the first human-body region 330 is determined, the processor 104 may execute S230 (by a second execution thread) to extract a first human-body feature from the first human-body region 330, and determine (by a third execution thread) whether there is a first historical object trajectory, matching the first human-body feature, among a plurality of historical object trajectories.

In an embodiment, the processor 104 may input the first human-body region 330 into a human-body feature extraction model that is trained through a training process. Based on this human-body feature extraction model, the processor 104 may extract a first human-body feature from the first human-body region 330.

In an embodiment, the above-mentioned human-body feature extraction model is a Person Re-identification (ReID) model. In the embodiment of the present disclosure, in order to improve the efficiency of the above-mentioned human-body feature extraction model, the present disclosure also provides a mechanism, for enhancing data in the trained data set, of which the details are described as below.

In an embodiment, the training on the human-body feature extraction model refers to obtaining a training image data set through another processor or server (not shown in the figure, not processor 104); the training image data set may include a plurality of training images that have the same preset size. In an embodiment, the training image data set is, for example, Market1501 or Mars, and the preset size of each training image is, for example, 128×256, but may not be limited thereto.

Figure 4:
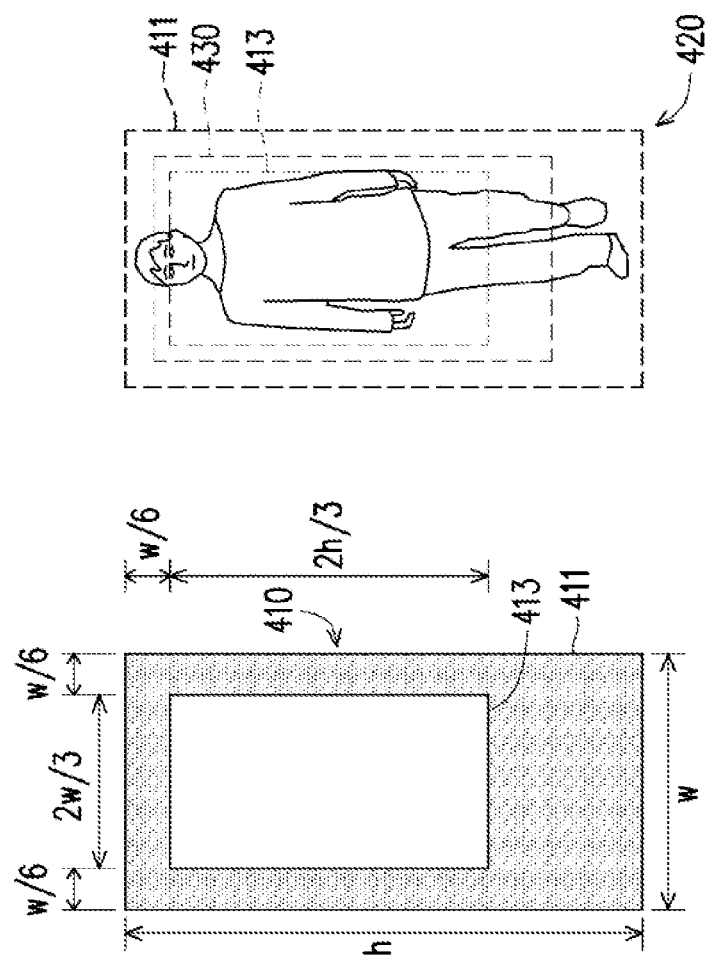
FIG. 4 is a schematic diagram of determining a cropping region in a training image on the basis of a cropping template according to an embodiment of the present disclosure.

Then, the processor or server may determine a cropping template on the basis of the above preset size. In order to make the concept of the present disclosure easier to understand, the following further description is supplemented with FIG. 4. Referring to FIG. 4, it is a schematic diagram of determining a cropping region in a training image on the basis of a cropping template according to an embodiment of the present disclosure.

In FIG. 4, assuming that the preset size of each training image in the considered training image data set is w×h (its aspect ratio w:h is equal to the preset image aspect ratio $w_2:h_2$), the processor or server may determine a cropping template 410 accordingly. As shown in FIG. 4, the cropping template 410 may include an outer contour 411 and an inner contour 413 inside the outer contour 411. A preset size of the outer contour 411 is w×h, and a size of the inner contour 413 of another preset size which is equally scaled, for example, (2w/3)×(2h/3).

In an embodiment, the relative position of the outer counter 411 and the inner counter 413 may be shown as FIG. 4, which is only used as an example, and is not used to limit the possible implementations of the present disclosure. In other embodiments, the designer may adjust the relative position between the outer counter 411 and the inner counter 413 as needed, which is not limit to the state shown in FIG. 4.

Then, the processor or server may randomly crop each training image in the training image data set on the basis of the cropping template 410, and train the abovementioned human-body feature extraction model on the basis of each cropped training image. In an embodiment, each training image is randomly cropped out by the same aspect ratio $w_2:h_2$ between the outer contour 411 and the inner contour 413 of the cropping template 410; each cropped training image is of a size that may be randomly distributed between the outer counter 411 and the inner counter 413, while the aspect ratio of each cropped training image needs to be kept to $w_2$ $h_2$.

In FIG. 4, assuming that a training image 420 is one of the above training images, the processor or server may determine a cropping region 430 in the training image 420 on the basis of the cropping template 410. As shown in FIG. 4, the border of the cropping region 430 in the training image 420 is between the outer counter 411 and the inner counter 413 of the cropping template 410. That is, the cropping region 430 needs to cover the range corresponding to the inner counter 413 but not exceed the range corresponding to the outer contour 411.

In an embodiment, the position of the cropping region in each training image may be different, but the aspect ratio of the cropping region in each training image needs to be kept as $w_2:h_2$.

After the corresponding cropping region in each training image is determined, the processor or server may train the above-mentioned human-body feature extraction model on the basis of the cropping region in each training image. Thus, after training of the abovementioned human-body feature extraction model is completed, the processor 104 may determine the first human-body region 330 of an aspect ratio equal to the aspect ratio $w_2:h_2$ from the image frame 300 by the human-body feature extraction model, so as to extract the first human-body feature.

In an embodiment, the image frame 300 further includes a second human-face region. The processor 104 may generate a second converted human-face region corresponding to the second human-face region on the basis of the manner of generating the first converted human-face region 320, and determine a second human-body region corresponding to the second human-face region on the basis of the manner of determining the first human-body region 330. If the image frame 300 includes a plurality of objects (human bodies), then it is necessary to determine whether the first human-body region 330 is shielded by another object before extracting the first human-body feature from the first human-body region 330. Specifically, it is determined whether the first human-body 330 is shielded by judging whether the first human-body region 330 includes another object, for example, the second converted human-face region.

In the scenario of FIG. 3, because the first human-body region 330 does not include another object, for example, the second converted human-face region, the processor 104 may smoothly/accurately extract the first human body feature therefrom. However, in other embodiments, when the first human-body region 330 includes another object, for example, the second converted human-face region, it means that the first human-body region 330 may be shielded by said another object, resulting in that the processor 104 may not smoothly/accurately extract the first human body feature therefrom. In this case, the present disclosure further proposes a corresponding occlusion processing mechanism to prevent the abovementioned occlusion condition affecting the extraction of the first human-body feature. Related details will be further described with reference to FIG. 5.

Back to the condition in FIG. 3 that the first human-body region 330 does not include another object. After the first human-body feature is extracted from the first human-body region 330, the processor 104 may determine whether there is a first historical object trajectory, matching the first human-body feature, among the plurality of historical object trajectories. In the embodiment, the plurality of historical object trajectories are, for example, trajectories corresponding to the tracked human bodies, and each historical object trajectory may have a corresponding tracker. In an embodiment, each tracker may record information such as identification (i.e., track ID), age, historical deep feature, position, and human-body region (hereinafter referred to as historical human-body region) of the human body corresponding thereto. Related concepts may refer to the description in the foregoing embodiments, which will not be repeated here.

In the embodiment, assuming that an object corresponding to each historical object trajectory is the human body, the historical deep feature corresponding to each historical object trajectory may be referred to as the historical human-body feature, but may not be limited to this. In this case, the processor 104 may generate an estimated position for each historical object trajectory on the basis of a plurality of historical positions of the historical object trajectory. In an embodiment, the processor 104 may adopt a Kalman filter to generate the estimated position for each historical object trajectory on the basis of the abovementioned historical positions for the historical object trajectory.

Then, the processor 104 may determine a first matching result between the position for the first human-body region 330 and the estimated position for each historical object trajectory. Related details may refer to the content of state matching mentioned above, which will not be repeated here.

In addition, the processor 104 may estimate a second distance between the first human-body feature and the historical human-body feature of each historical object trajectory so as to determine a second matching result. Related details may refer to the content of deep feature matching mentioned above, which will not be repeated here.

Then, the processor 104 may generate a synthetic matching result based on the first matching result and the second matching result. Detail results may refer to the content of synthetic matching mentioned above, which will not be repeated here.

After the synthetic matching result is obtained, the processor 104 may determine whether or not the synthetic matching result indicates that the first human-body feature corresponds to one of the abovementioned historical object trajectories. In response to determining that the synthetic matching result indicates that the first human-body feature corresponds to one of the abovementioned historical object trajectories, the processor 104 may determine that the one of the abovementioned historical object trajectories is a first historical object trajectory that matches the first human-body feature, and may accordingly execute S240 (by a third execution thread). In addition, in response to determining that the synthetic matching result indicates that the first-human body feature does not correspond to any of the abovementioned historical object trajectories, the processor 104 may determine that there is no historical object trajectory matching the first human-body feature, and may accordingly execute S250 (by the third execution thread).

In S240, the processor 104 may update a first age of the first historical object trajectory to a preset value (e.g., 1). In addition, in S250, the processor 104 may add a reference object trajectory corresponding to the first human-body feature to the plurality of historical object trajectories, set a reference age of the reference object trajectory as a preset value (e.g., 1), and configure a corresponding tracker for the reference object trajectory. Details of S240 and S250 may refer to the content of trajectory processing mentioned above, which will not be repeated here.

As mentioned above, in other embodiments, when there is another object, for example, the second converted human-face region, in the first human-body region 330, the processor 104 may further determine whether an occlusion relationship exists so as to execute a corresponding occlusion processing. In an embodiment, in response to determining that there is another object, such as the second converted human-face region, in the first human-body region 330, the processor 104 may further determine whether said another object is located below the first converted human-face region 320 and whether a side length of said another object (e.g., the second converted human-face region) is greater than the side length of the first converted human-face region 320, so as to determine whether said another object does shield the first human-body region 330. When said another object is located below the first converted human-face region 320 and the side length of said another object (e.g., the second converted human-face region) is greater than the side length of the first converted human-face region 320, it means that said another object is closer to an image capturing device. With reference to the conclusion that the first human-body region 330 includes said another object, it can be determined that said another object does shield the first human-body region 330, the occlusion relationship indeed exists, and the processor 104 executes the corresponding occlusion processing accordingly.

Specifically, by the processor 104, a linear distance (hereinafter referred to as a specific distance) between the first converted human-face region 320 and said another object (e.g., the second converted human-face region) is obtained, and whether the specific distance is greater than a threshold value is determined. If the specific distance is greater than the threshold value, it means that the second converted human-face region is far away from the first converted human-face region (which may be referred to as a scenario of weak occlusion). Correspondingly, the processor 104 may adjust the first human-body region 330 by shielding a first region in the second converted human-face region. The threshold value is, for example, 1.5 times of the side length s of the first converted human-face region 320, but may not be limited thereto. In other embodiments, the designer may select a desired threshold value as needed.

Figure 5:
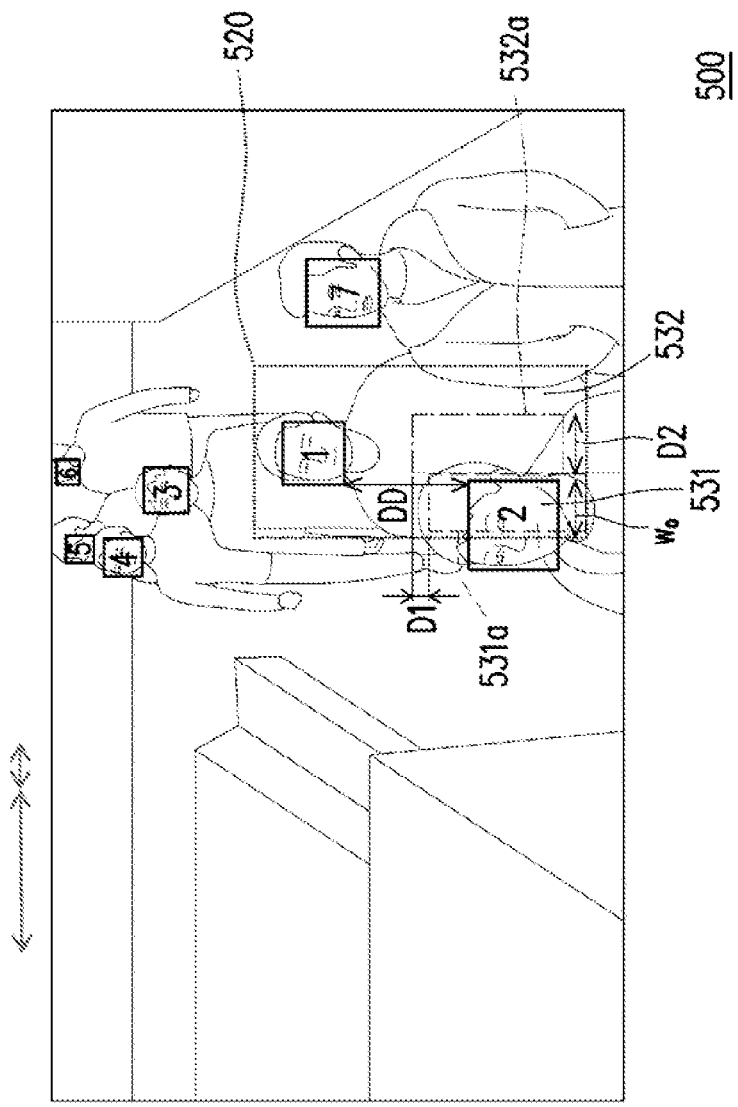
FIG. 5 is a schematic diagram of performing occlusion processing for a scenario of weak occlusion according to an embodiment of the present disclosure.

FIG. 5 is a schematic diagram of performing occlusion processing for a scenario of weak occlusion according to an embodiment of the present disclosure. In FIG. 5, assuming that the processor 104 has obtained a plurality of converted human-face regions 1 to 7 (which are respectively a square) corresponding to a plurality of human-face regions by conversions from an image frame 500 according to teaching of the foregoing embodiments. For ease of illustration, the converted human-face region 1 is understood as the first converted human-face region as considered. In this case, the processor 104 may determine a corresponding first human-body region 520 for the converted human-face region 1 according to the previous teaching.

In the scenario of FIG. 5, it can be seen that the converted human-face region 2 is partially included in the first human-body region 520, the converted human-face region 2 is located below the converted human-face region 1, and the side length of the converted human-face region 2 is greater than the side length of the converted human-face region 1, so it can be determined that an occlusion relationship between the converted human-face region 2 (the other object) and the first human-body region 520 exists. Then, the processor 104 may obtain a specific distance DD between the converted human-face region 2 and the converted human-face region 1, and determine whether the specific distance DD is greater than a threshold value.

In FIG. 5, assuming that the processor 104 determines that the specific distance DD is greater than the threshold value, the processor 104 may adjust the first human-body region 520 by an overlap region 531 between the converted human-face region 1 and the first human-body region 520.

In an embodiment, the processor 104 may obtain the overlap region 531 between the converted human-face region 1 and the first human-body region 520, and a non-overlap region 532.

In an embodiment, the processor 104 may define a first region 531*a* based on the overlap region 531, and the first region 531*a* may include the overlap region 531. In an embodiment, the processor 104 may vertically expand a region (hereinafter referred to as a first image range) in the shape of a square (a maximum rectangle or square that may be framed) in the overlap region 531 to a preset boundary, and take the expanded first image range as the first region 531*a*.

For example, the processor 104 may expand upwards the first image range of the overlap region 531 by 0.5 times of the side length (represented by s1) of the converted human-face region 1, and expand downwards to the bottom of the first human-body region 520, so as to define the first region 531*a*. However, this is only an example to make the practice of the present disclosure clear to the reader, and is not intended to limit the present disclosure.

Then, the processor 104 may define a second region 532*a* in the non-overlap region 532 on the basis of the first region 531*a*, and cover the first region 531*a* with the image content of the second region 532a. A size of the second region 532a is set to be not less than a size of the first region 531a.

Specifically, as shown in FIG. 5, the processor 104 may move the first region 531a vertically by a first designated distance D1 and horizontally by a second designated distance D2. The first region 531a being moved vertically and horizontally is used as the second region 532a. In an embodiment, the first designated distance D1 is, for example, 0.25 times of s1, and the second designated distance D2 is, for example, equal to a width $w_0$ of the overlap region 531. But the present disclosure may not be limited thereto.

In addition, the processor 104 may determine a horizontal moving direction of the image range of the first region 531a based on the relative position between the converted human-face regions 1 and 2. In FIG. 5, the converted human-face region 2 is at the upper right of the converted human-face region 1, so that the processor 104 may move upwards the image range of the first region 531a by the first designated distance D1, and then horizontally move it to the right by the second designated distance D2, so as to determine the second region 532a. In other embodiments, when the converted human-face region 2 is at the upper left of the converted human-face region 1, the processor 104 may move upwards the image range of the first region 531a by the first designated distance D1, and then horizontally move it to the left by the second designated distance D2, so as to determine the second region 532a, but the present disclosure may not be limited thereto.

After the second region 532a is determined, the processor 104 may cover the first region 531a with the image content of the second region 532a such that the first region 531a is replaced. Thus, a first human-body feature extraction operation on the first human-body region 520 may not be affected by the part, shielding the first human-body region 520, of the converted human-face region 2, but the present disclosure may not be limited thereto.

In other embodiments, if the specific distance DD between the converted human-face region 1 and the converted human-face region 2 is less than a threshold value, it means that the converted human-face region 1 is close to the converted human-face region 2 (which may be called as a scenario of strong occlusion). Correspondingly, the processor 104 may directly execute a state matching operation on the basis of the first human-body region 520 to generate a first matching result. Related details may refer to the content of state matching described in the foregoing embodiments, which will not be repeated here.

In an embodiment, the processor 104 may perform an intersection-over-union (IoU) matching operation on the basis of the first human body region 520 and the abovementioned historical human-body region to generate a second matching result corresponding to the first human-body region 520. For details of the above IoU matching operation, reference may be made to the content of "Erik Bochinski, Volker Eiselein and Thomas Sikora: High-Speed Tracking-by-Detection Without Using Image Information. In: IEEE AVSS 2017, August 2017, Lecce, ITALY", which will not be repeated here.

Then, the processor 104 may determine a specific object trajectory corresponding to the first human-body region 520 on the basis of the first matching result and the second matching result. In an embodiment, the processor 104 may generate a corresponding synthetic matching result based on the first matching result and the second matching result, and then determine an object trajectory corresponding to the first human-body region 520, as the abovementioned specific object trajectory, accordingly. Detail results may refer to the content of synthetic matching mentioned above, which will not be repeated here.

In addition, in the present disclosure, different steps may be executed by different execution threads, so that the processing efficiency may be further improved, and the number of image frames that the processor can process per second, known as the frame rate, may be increased. For example, at a $t^{th}$ (t is a time index value) time point, the processor 104 may execute a first operation related to an $i^{th}$ (i is an image index value) image frame by a first execution thread, such as finding out a face region/determining a human-body region.

At a $(t+1)^{th}$ time point, the processor 104 may execute a second operation related to the $i^{th}$ image frame by a second execution thread, such as extracting a human-body feature. Also, the processor 104 may execute a first operation related to an $(i+1)^{th}$ image frame by the first execution thread, such as finding out a human-face region/determining a human-body region.

At a $(t+2)^{th}$ time point, the processor 104 may execute a third operation related to the $i^{th}$ image frame by a third execution thread, such as state estimation, trajectory processing and matching. Moreover, the processor 104 may execute a second operation related to the $(i+1)^{th}$ image frame by the second execution thread, such as extracting a human-body feature, and may execute a first operation related to an $(i+2)^{th}$ image frame by the first execution thread, such as finding out a human-face region/determining a human-body region. Thus, in the present disclosure, the frame rate is increased while the matching success rate is increased, thereby improving the tracking effect.

In summary, according to the embodiments of the present disclosure, in addition to obtaining of the human-face region in the image frame, the human-body region corresponding to the human-face region may be determined, and then the human-body extraction operation can be performed on the human-body region. Then, in the present disclosure, subsequent operations such as state estimation, trajectory processing and matching (e.g., state matching/deep feature matching) may be performed on the basis of the extracted human-body feature.

In the present disclosure, relatively distinctive and stable human body features are used for matching, so that the success rate of feature matching is higher, and a better tracking effect can be achieved. In addition, in the present disclosure, the corresponding human-body region is determined based on the human-face region, therefore, there is no need to specifically train a human-body detection model or a model that can detect both the human face and body. On such basis, the present disclosure also has the advantages of simplicity and high speed. In some embodiments, the present disclosure also provides corresponding occlusion processing means for the scenario of weak/strong occlusion, thereby further improving the tracking effect.

In addition, in the present disclosure, different steps may be executed by different execution threads, so that the frame rate may be increased while the matching success rate is increased, thereby improving the tracking effect.

The above descriptions are only preferred embodiments of the present disclosure, but are not intended to limit the scope of the present disclosure. Anyone skilled in the art can make further improvements and changes on this basis without departing from the spirit and scope of the present disclosure. Therefore, the scope of protection of the present disclosure shall be based on the scope defined by the claims of the present application.

What is claimed is:

1. An object tracking method, comprising:
acquiring a first human-face region of an image frame;
determining a first human-body region based on the first human-face region;
extracting a first human-body feature from the first human-body region, and determining whether a plurality of historical object trajectories match the first human-body feature;
in response to that one of the plurality of historical object trajectories matches the first human-body feature, updating a first age of the first human-body feature to a preset value; and
in response to that none of the plurality of historical object trajectories matches the first human-body feature, adding an object trajectory corresponding to the first human-body feature to the plurality of historical object trajectories.

2. The object tracking method according to claim 1, wherein said determining the first human-body region based on the first human-face region includes:
determining the first human-body region based on an image cropping aspect ratio.

3. The object tracking method according to claim 2, wherein acquisition of the first human-body region depends on an expansion parameter making an aspect ratio of the first human-body region equal to the image cropping aspect ratio.

4. The object tracking method according to claim 2, wherein said determining the first human-body region based on the first human-face region includes:
converting the first human-face region into a converted human-face region, and
determining the first human-body region based on the converted human-face region.

5. The object tracking method according to claim 4, wherein the converted human-face region is obtained based on a center point and angular coordinates of the first human-face region.

6. The object tracking method according to claim 1, wherein after determining the first human-body region, the object tracking method further comprises:
in response to that the first human-body region is shielded by another object, obtaining a specific distance between said another object and a first converted human-face region; and
in response to that the specific distance is greater than a threshold value, adjusting the first human-body region by a first region of said another object, the first region shielding the first human-body region.

7. The object tracking method according to claim 6, wherein said adjusting the first human-body region by the first region includes:
translating the first region to select a second region of the first human-body region that is not shielded, and covering the first region with image content of the second region, wherein a size of the second region is not less than a size of the first region.

8. The object tracking method according to claim 6, wherein in response to the specific distance being not greater than the threshold value, the object tracking method further comprises:
executing a state matching operation based on the first human-body region to generate a first matching result;
executing an intersection over union matching operation based on the first human-body region and a historical human-body region to generate a second matching result corresponding to the first human-body region; and
determining a specific object trajectory corresponding to the first human-body region based on the first matching result and the second matching result.

9. The object tracking method according to claim 1, wherein said extracting the first human-body feature from the first human-body region includes:
inputting the first human-body region to a human-body feature extraction model, wherein the human-body feature extraction model extracts the first human-body feature based on the first human-body region.

10. The object tracking method according to claim 1, further comprising enhancing a human-face detection model to provide an image cropping aspect ratio for determining the first human-body region, wherein said enhancing the human-face detection model includes:
obtaining a training image data set, wherein the training image data set includes a plurality of training images, and each training image has a same preset size;
determining a cropping region based on the preset size, wherein the cropping region includes an outer contour and an inner contour, the outer contour has the preset size, and the inner contour is a scaled down version of the outer contour; and
determining a cropping region randomly in each training image based on the inner contour and the outer contour.

11. An object tracking device, comprising:
a storage circuit storing program codes;
a processor, coupled to the storage circuit, for accessing the program codes to:
acquire a first human-face region of an image frame;
determine a first human-body region based on the first human-face region;
extract a first human-body feature from the first human-body region, and determine whether a plurality of historical object trajectories match the first human-body feature;
in response to that one of the plurality of historical object trajectories matches the first human-body feature, update a first age of the first human-body feature to a preset value; and
in response to that none of the plurality of historical object trajectories matches the first human-body feature, add an object trajectory corresponding to the first human-body feature to the plurality of historical object trajectories.

12. The object tracking device according to claim 11, wherein the processor is configured to determine the first human-body region based on an image cropping aspect ratio.

13. The object tracking device according to claim 12, wherein acquisition of the first human-body region depends on an expansion parameter making an aspect ratio of the first human-body region equal to the image cropping aspect ratio.

14. The object tracking device according to claim 12, wherein the processor is configured to:
convert the first human-face region into a converted human-face region, and
determine the first human-body region based on the converted human-face region.

15. The object tracking device according to claim 14, wherein the converted human-face region is obtained based on a center point and angular coordinates of the first human-face region.

16. The object tracking device according to claim 11, wherein after determining the first human-body region, the processor is further configured to:
- in response to that the first human-body region is shielded by another object, obtain a specific distance between said another object and a first converted human-face region; and
- in response to that the specific distance is greater than a threshold value, adjust the first human-body region by a first region of said another object, the first region shielding the first human-body region.

17. The object tracking device according to claim 16, wherein the processor is configured to:
- translate the first region to select a second region of the first human-body region that is not shielded, and cover the first region with image content of the second region, wherein a size of the second region is not less than a size of the first region.

18. The object tracking device according to claim 16, wherein in response to the specific distance being not greater than the threshold value, the processor is further configured to:
- execute a state matching operation based on the first human-body region to generate a first matching result;
- execute an intersection over union matching operation based on the first human-body region and a historical human-body region to generate a second matching result corresponding to the first human-body region; and
- determine a specific object trajectory corresponding to the first human-body region based on the first matching result and the second matching result.

19. The object tracking device according to claim 11, wherein the processor is configured to:
- input the first human-body region to a human-body feature extraction model, wherein the human-body feature extraction model extracts the first human-body feature based on the first human-body region.

20. The object tracking device according to claim 11, wherein the processor is further configured to enhance a human-face detection model to provide an image cropping aspect ratio for determining the first human-body region, wherein the processor is configured to:
- obtain a training image data set, wherein the training image data set includes a plurality of training images, and each training image has a same preset size;
- determine a cropping region based on the preset size, wherein the cropping region includes an outer contour and an inner contour, the outer contour has the preset size, and the inner contour is a scaled down version of the outer contour; and
- determine a cropping region randomly in each training image based on the inner contour and the outer contour.

21. An object tracking device, comprising:
- a storage circuit storing program codes;
- a processor, coupled to the storage circuit, for accessing the program codes to:
- by a first execution thread, find out a first human-face region from an image frame and determine a first human-body region based on the first human-face region;
- by a second execution thread, extract a first human-body feature from the first human-body region;
- by a third execution thread:
  - determine whether a plurality of historical object trajectories match the first human-body feature;
  - in response to that one of the plurality of historical object trajectories matches the first human-body feature, update a first age of the first human-body feature to a preset value; and
  - in response to that none of the plurality of historical object trajectories matches the first human-body feature, add an object trajectory corresponding to the first human-body feature to the plurality of historical object trajectories.

* * * * *